US010521395B1

(12) United States Patent
Fick et al.

(10) Patent No.: US 10,521,395 B1
(45) Date of Patent: Dec. 31, 2019

(54) SYSTEMS AND METHODS FOR IMPLEMENTING AN INTELLIGENCE PROCESSING COMPUTING ARCHITECTURE

(71) Applicant: Mythic, Inc., Austin, TX (US)

(72) Inventors: David Fick, Austin, TX (US); Malav Parikh, Austin, TX (US); Paul Toth, Austin, TX (US); Adam Caughron, Austin, TX (US); Vimal Reddy, Austin, TX (US); Erik Schlanger, Austin, TX (US); Sergio Schuler, Austin, TX (US); Zainab Nasreen Zaidi, Austin, TX (US); Alex Dang-Tran, Austin, TX (US); Raul Garibay, Austin, TX (US); Bryant Sorensen, Austin, TX (US)

(73) Assignee: Mythic, Inc., Austin, TX (US)

( * ) Notice: Subject to any disclaimer, the term of this patent is extended or adjusted under 35 U.S.C. 154(b) by 0 days.

(21) Appl. No.: 16/458,917

(22) Filed: Jul. 1, 2019

Related U.S. Application Data

(60) Provisional application No. 62/694,355, filed on Jul. 5, 2018.

(51) Int. Cl.
*G06F 15/78* (2006.01)
*G06F 15/173* (2006.01)
(Continued)

(52) U.S. Cl.
CPC ........ *G06F 15/7825* (2013.01); *G06F 9/3887* (2013.01); *G06F 15/17337* (2013.01); *G06F 17/16* (2013.01); *H04L 45/38* (2013.01)

(58) Field of Classification Search
CPC .... G06F 15/7825; G06F 9/3887; G06F 17/16; G06F 15/17337; H04L 45/38
See application file for complete search history.

(56) References Cited

U.S. PATENT DOCUMENTS 5,355,508 A  *  10/1994  Kan ..................... G06F 15/167
                                                         712/20
5,442,760 A  *  8/1995  Rustad ................ G06F 9/3806
                                                         711/E12.046
(Continued)

OTHER PUBLICATIONS

Venkataramani, Swagath, et al., "SCALEDEEP: A Scalable Compute Architecture for Learning and Evaluating Deep Networks", ISCA 17 on Jun. 24-28, 2017 Ontario, Canada, pp. 13-26.
(Continued)

*Primary Examiner* — Mohammad S Anwar
(74) *Attorney, Agent, or Firm* — Jeffrey Schox; Padowithz Alce

(57) ABSTRACT

Systems and methods include an integrated circuit that includes a plurality of computing tiles, wherein each of the plurality of computing tiles includes: a matrix multiply accelerator, a computing processing circuit; and a flow scoreboard module; a local data buffer, wherein the plurality of computing tiles together define an intelligence processing array; a network-on-chip system comprising: a plurality of network-on-chip routers establishing a communication network among the plurality of computing tiles, wherein each network-on-chip router is in operable communication connection with at least one of the plurality of computing tiles and a distinct network-on-chip router of the plurality of network-on-chip routers; and an off-tile buffer that is arranged in remote communication with the plurality of computing tiles, wherein the off-tile buffer stores raw input data and/or data received from an upstream process or an upstream device.

16 Claims, 7 Drawing Sheets

(51) Int. Cl.
*G06F 9/38* (2018.01)
*H04L 12/721* (2013.01)
*G06F 17/16* (2006.01)

(56) References Cited

U.S. PATENT DOCUMENTS

| | | | |
|---|---|---|---|
| 6,609,193 | B1 | 8/2003 | Douglas et al. |
| 9,432,298 | B1 * | 8/2016 | Smith ................ H04L 49/9057 |
| 2002/0069393 | A1 | 6/2002 | Cismas |
| 2002/0141344 | A1 | 10/2002 | Chidambaran et al. |
| 2007/0103476 | A1 | 5/2007 | Huang et al. |
| 2009/0010260 | A1 | 1/2009 | May |
| 2012/0294317 | A1 | 11/2012 | Livne et al. |
| 2012/0303933 | A1 | 11/2012 | Manet et al. |
| 2014/0173192 | A1 | 6/2014 | Omtzigt |
| 2018/0026654 | A1 | 1/2018 | Gopal et al. |
| 2018/0081734 | A1 | 3/2018 | Nandan et al. |
| 2018/0174032 | A1 | 6/2018 | Davies et al. |
| 2018/0287964 | A1 * | 10/2018 | Gray .................... H04L 49/109 |
| 2019/0004980 | A1 | 1/2019 | Maor |

OTHER PUBLICATIONS

"International Search Report and Written Opinion of the ISA dated Oct. 31, 2019 for PCT/US19/40122."

* cited by examiner

RECEIVING INPUT DATA S210

LOADING INPUT DATA TO IPU S220

EXECUTING COMPUTATIONS S230

GENERATING TOKENS S240

PROVIDING A FINAL OUTPUT S250

FIGURE 2

The token-count table contains NUMBER entries. Each entry consists of the following fields:

| field | size | description |
|---|---|---|
| count_value | 8 bits | running count of tokens received (signed value) |
| condition_cfg | 3 bits | trigger condition for token count (multiple bits can be set; effective condition is a logical OR of all the enabled conditions.)<br>bit 0: less than zero<br>bit 1: equal to zero<br>bit 2: greater than zero |
| program_id | log2(NUMBER PROGRAM TABLE ENTRIES) bits | pointer to program table entry for which this token counter condition is a prerequisite |

FIGURE 4

The program table contains NUMBER entries. Each entry consists of the following fields:

| field | size | description |
|---|---|---|
| count_value | 8 bits | running count of satisfied prerequisite conditions (signed value) |
| condition_cfg | 3 bits | trigger condition for token count (multiple bits can be set; effective condition is a logical OR of all the enabled conditions.)<br>bit 0: less than zero<br>bit 1: equal to zero<br>bit 2: greater than zero |

FIGURE 5

SYSTEMS AND METHODS FOR IMPLEMENTING AN INTELLIGENCE PROCESSING COMPUTING ARCHITECTURE

CROSS-REFERENCE TO RELATED APPLICATIONS

This application claims the benefit of U.S. Provisional Application No. 62/694,355, filed 5 Jul. 2018, which is incorporated in its entirety by this reference.

TECHNICAL FIELD

The inventions described herein relate generally to the integrated circuitry architecture field, and more specifically to new and useful intelligent integrated circuits and methods of computing with the intelligent integrated circuit in the integrated circuitry architecture field.

BACKGROUND

Today, the various implementations of artificial intelligence and machine learning are driving innovation in many fields of technology. Artificial intelligence (AI) systems and artificial intelligence models (including algorithms) are defined by many system architectures and models that enable machine learning (deep learning), reasoning, inferential capacities, and large data processing capabilities of a machine (e.g., a computer and/or a computing server). These AI systems and models are often trained intensively to perform one or more specific tasks, such as natural language processing, image recognition, planning, decision-making, and the like. For example, a subset of these AI systems and models include artificial neural network models. The training of an artificial neural network model may, in many cases, require thousands of hours across the training cycle and many terabytes of training data to fine tune associated neural network algorithm(s) of the model before use.

However, once trained, a neural network model or algorithm may be deployed quickly to make inferences to accomplish specific tasks (e.g., recognizing speech from speech input data, etc.) based on relatively smaller datasets when compared to the larger training datasets used during the training cycle. The inferences made by the neural network model or algorithm based on the smaller datasets may be a prediction about what the neural network model calculates to be a correct answer or indication about a circumstance.

Still, while neural network models implementing one or more neural network algorithms may not require a same amount of compute resources, as required in a training phase, deploying a neural network model in the field continues to require significant circuitry area, energy, and compute power to classify data and infer or predict a result. For example, weighted sum calculations are commonly used in pattern matching and machine learning applications, including neural network applications. In weighted sum calculations, an integrated circuit may function to multiply a set of inputs ($x_i$) by a set of weights ($w_i$) and sum the results of each multiplication operation to calculate a final result ($z$). Typical weighted sum calculations for a machine learning application, however, include hundreds or thousands of weights which causes the weighted sum calculations to be computationally expensive to compute with traditional digital circuitry. Specifically, accessing the hundreds or thousands of weights from a digital memory requires significant computing time (i.e., increased latency) and significant energy.

Accordingly, traditional digital circuitry required for computing weighted sum computations of a neural network model or the like tend to be large to accommodate a great amount of digital memory circuitry needed for storing the hundreds of thousands of weights required for the neural network model. Due to the large size of the circuitry, more energy is required to enable the compute power of the many traditional computers and circuits.

Additionally, these traditional computers and circuits for implementing artificial intelligence models and, namely, neural network models may be suitable for remote computing processes, such as in distributed computing systems (e.g., the cloud), or when using many onsite computing servers and the like. However, latency problems are manifest when these remote artificial intelligence processing systems are used in computing inferences and the like for remote, edge computing devices or in field devices. That is, when these traditional remote systems seek to implement a neural network model for generating inferences to be used in remote field devices, there are unavoidable delays in receiving input data from the remote field devices because the input data must often be transmitted over a network with varying bandwidth and subsequently, inferences generated by the remote computing system must be transmitted back to the remote field devices via a same or similar network. Additionally, these traditional circuit often cannot manage the computing load (e.g., limited storage and/or limited compute) and may often rely on remote computing systems, such as the cloud, to perform computationally-intensive computations and store the computation data (e.g., raw inputs and outputs. Thus, constant and/or continuous access (e.g., 24×7 access) to the remote computing systems (e.g., the cloud) is required for continuous operation, which may not be suitable in many applications either due to costs, infrastructure limitations (e.g., limited bandwidth, low grade communication systems, etc.), and the like.

Implementing AI processing systems at the field level (e.g., locally at the remote field device) may be a proposed solution to resolve some of the latency issues. However, attempts to implement some of these traditional AI computers and systems at an edge device (e.g. remote field device) may result in a bulky system with many circuits, as mentioned above, that consumes significant amounts of energy due to the required complex architecture of the computing system used in processing data and generating inferences. Thus, such a proposal without more may not be feasible and/or sustainable with current technology.

Accordingly, there is a need for a deployable system for implementing artificial intelligence models locally in the field (e.g., local AI), and preferably to be used in edge devices, that do not result in large, bulky (edge) devices, that reduces latency, and that have necessary compute power to make predictions or inferences, in real-time or substantially real-time, while also being energy efficient.

The below-described embodiments of the present application provide such advanced and improved integrated circuits and implementation techniques capable of addressing the deficiencies of traditional systems and integrated circuit architectures for implementing AI and machine learning.

BRIEF DESCRIPTION OF THE FIGURES

FIG. 2 illustrates a method of data processing using an integrated circuit in accordance with one or more embodiments of the present application;

FIG. 4 illustrates a schematic of a first token-based control data structure for implementation with an integrated circuit in accordance with one or more embodiments of the present application;

FIG. 5 illustrates a schematic of a second token-based control data structure for implementation with an integrated circuit in accordance with one or more embodiments of the present application;

BRIEF SUMMARY OF THE INVENTION(S)

Figure 1:
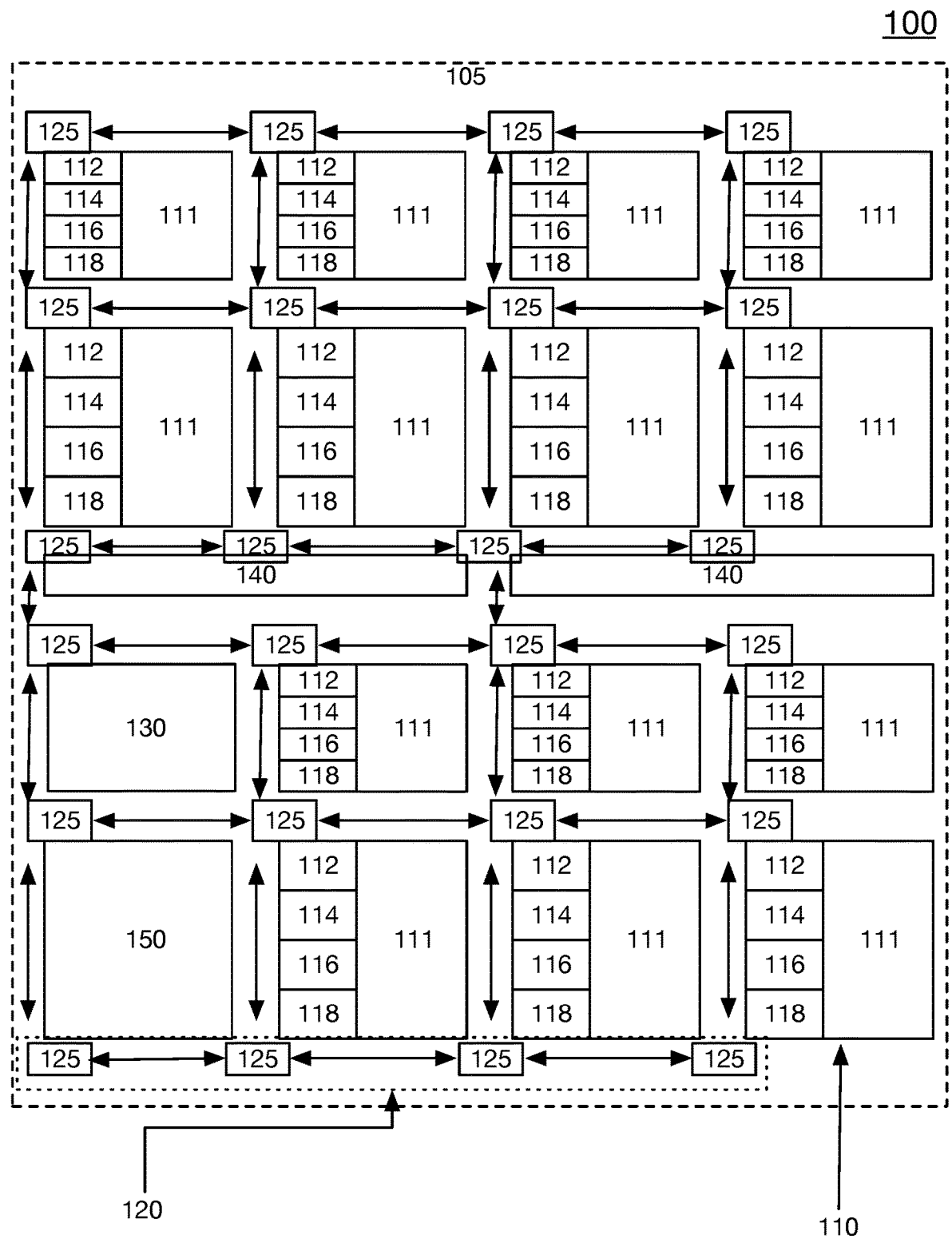
FIGS. 1-1A illustrates a schematic of an intelligence integrated circuit 100 in accordance with one or more embodiments of the present application.

In one embodiment, the integrated circuit includes a plurality of computing tiles, wherein each of the plurality of computing tiles comprises: a matrix multiply accelerator, a computing processing circuit; and a flow scoreboard module; a local data buffer, wherein the plurality of computing tiles together define an intelligence processing array; a network-on-chip system comprising: a plurality of network-on-chip routers establishing a communication network among the plurality of computing tiles, wherein each network-on-chip router is in operable communication connection with at least one of the plurality of computing tiles and a distinct network-on-chip router of the plurality of network-on-chip routers; and an off-tile buffer that is arranged in remote communication with the plurality of computing tiles, wherein the off-tile buffer stores raw input data and/or data received from an upstream process or an upstream device.

In one embodiment, a distinct one of the plurality of local data buffers is arranged adjacent the matrix multiply accelerator of a respective one of the plurality of computing tiles.

In one embodiment, the flow scoreboard module includes a configuration interface that reads and/or writes an internal state of the flow scoreboard module; a token interface presents token tokens to the flow scoreboard module that responsively triggers an update to the internal state of the flow scoreboard module; a notification interface indicates to the integrated circuit whether one or more conditions for executing one or more programs or one or more applications have been satisfied.

In one embodiment, the integrated circuit includes a tile sector controller circuit includes a high voltage circuit that reprograms each of a plurality of non-volatile memories of at least a subset of the plurality of computing tiles into one or more distinct memory states.

In one embodiment, the integrated circuit includes a serial connection bus that is arranged between the off-tile buffer and the plurality of computing tiles, wherein the serial connection bus passes data from the off-tile buffer to one or more local data buffers of the plurality of computing tiles.

In one embodiment, each of the plurality of computing tiles further comprises: a single instruction multiple data unit.

In one embodiment, the intelligence processing array includes a plurality of distinct data processing pipelines, wherein each of the plurality of distinct data processing pipelines is defined by a distinct subset of the plurality of computing tiles within the intelligence processing array.

In one embodiment, the intelligence processing array processes a plurality of distinct applications or programs, and each of the plurality of distinct data processing pipelines of the integrated circuit array processes one of the plurality of distinct applications or programs.

In one embodiment, the intelligence processing array processes a plurality of distinct partitions of a single application or a single program, and each of the plurality of distinct data processing pipelines of the integrated circuit array processes one of the plurality of distinct partitions of the single application or the single program.

In one embodiment, each of the plurality of the intelligence processing pipeline includes a plurality of distinct stages, wherein each of the plurality of distinct stages includes at least one of the plurality of computing tiles that is specifically programmed to execute a fraction of an application or a program.

In one embodiment, each of the plurality of computing tiles access input data from its respective local data buffer; processes the input data at its respective matrix multiply accelerator; and returns an output of the input data back into the respective local data buffer.

In one embodiment, the flow scoreboard module includes a plurality of distinct interfaces that implement a flow control of data of data flowing through one or more intelligence processing pipelines and that control an execution of applications or programs being handled by the one or more intelligence processing pipelines of the intelligence processing array.

In one embodiment, the serial connection bus comprises one of a universal serial bus and a peripheral component interconnect express.

In one embodiment, the flow scoreboard comprises: a token count table that tracks: one or more distinct tokens generated by the integrated circuit, one or more token-based conditions; a program control table that controls an execution of one or more programs based on the tracking of the one or more distinct tokens.

In one embodiment, an intelligence processing integrated circuit includes a plurality of intelligence processing tiles, wherein each of the plurality of intelligence processing tiles comprises: an accelerator circuit, a processing circuit; and a token-based governance module; a local data storage circuit, wherein the plurality of intelligence processing tiles together define an intelligence processing array; a network-on-chip system comprising: a plurality of network-on-chip routers establishing a communication network among components of the intelligence processing integrated circuit, wherein each network-on-chip router is in operable communication connection with at least one of the plurality of computing tiles and a distinct network-on-chip router of the plurality of network-on-chip routers; and an off-tile buffer that is arranged in remote communication with the plurality of computing tiles, wherein the off-tile buffer stores raw input data and/or data received from an upstream process or an upstream device.

In one embodiment, the token-based governance module includes: a first token-based control data structure; a second token-based control data structure, wherein the first token-based control data structure and the second-token based control data operate in cooperation to control an automated flow of the input data and/or an automated processing of the input data through the intelligence processing array.

DESCRIPTION OF THE PREFERRED EMBODIMENTS

The following description of preferred embodiments of the present application are not intended to limit the inventions to these preferred embodiments, but rather to enable any person skilled in the art of to make and use these inventions.

1. Intelligence Processing Overview

Embodiments of the present application provide a flexible and reprogrammable system that can be programmed to accommodate various computationally-intensive applications or programs of varying complexity and size. While a physical configuration of an integrated circuit architecture according to one or more embodiments of the present application may remain the same or substantially the same, disparate processing elements within the architecture may be programmed to handle multiple applications or one or more sections of a single application.

Further, an implementation and particular arrangement of the storage devices implemented within one or more embodiments of the present application provide several technical benefits over state-of-the-art integrated circuits, including reducing a total requirement of memory or storage required for handling data-intensive applications or programs. For instance, in one embodiment, a main (large) buffer may be provided to receive input data (e.g., raw input data or data from an upstream layer or source) and each of a plurality of disparate local buffers may be arranged together with a computing element (e.g., a matrix multiply accelerator) in. In such embodiment, each local buffer may be arranged adjacent to or in an immediate vicinity of the computing element for fast access and therefore, efficient processing of input data from the main buffer.

Additionally, such an arrangement may allow for asynchronous processing of data along a data processing pipeline thereby enabling multiple segments of data to be processed at a same time and possibly in different stages along the pipeline. The requirement for duplication of data may be significantly reduced.

Additionally, one or more embodiments of the present application may function to implement a token-driven data processing system in which a central process control may not be required.

Specifically, in one or more embodiments, an integrated circuit of the present application may include an architecture that may trigger microprocessor (sometimes referred to herein as "nano-processor") programs and/or applications using tokens. While, in many embodiments described herein, the tokens may be used for automatically triggering an execution and/or implementation of programs or applications, in various implementations the tokens may be used to trigger other units. A few examples include, using the tokens to trigger finite state machines, trigger a release of a packet or a work-queue item, trigger the generation of another token, and/or the like. There may be limitless applications of the token-based governance module (sometimes referred to herein as the flow scoreboard module), described in several of the embodiments, for automatically triggering any type and/or any number of functions/operations with the integrated circuit.

In a preferred embodiment of the present application, the integrated circuit architecture may include a network-on-chip system that enables a communication and/or passing of tokens between distinct components of the integrated circuit. However, it shall be noted that any suitable token communication scheme and/or interconnect may be used including, but not limited to, serial communication buses or the like. An internally recognized constraint in some of the embodiments of the token-based integrated circuit architecture includes constraints in ordering and/or latency between a token and an event or request that the token may represent. For instance, in one embodiment of the present application, a token may not be released and/or generated (irrespective of an interconnect) until an associated triggering event is completed (e.g., an emptying of a local data buffer, a computation by an MMA or the like against input data, and/or any suitable event). In yet another embodiment, a token may be generated and/or released in advance of an associated triggering event if the early release of the token would not cause ordering constraints to be violated. Accordingly, in several of the embodiments of the present application, it shall be noted that the tokens can be deployed in any suitable manner to achieve a token-based control of the flow of data and/or the processing of data throughout an integrated circuit.

Additionally, the token-based governance module described herein may generally function to enable a token-based control by tracking tokens and token triggering conditions and the like. The token-based governance module may have configurable constraints so that triggering may also depend on a state of a local unit or circuit and not only based on a number of tokens identified or received. That is, in several embodiments of the present application, data flow, data processing, one or more operations/functions and the like may be governed based on the release or generation of tokens, it shall be noted that simply determining and/or identifying a state of a component of the integrated circuit and/or identifying a state of a process or operation within the integrated circuit may serve as a triggering event for yet automating another operation, function, process, or flow. For instance, a state of the utilization (e.g., depth) and/or capacity of one or more work queues may function as a triggering event. A technical benefit of such embodiments may be that an operation may only run when computing resources (e.g., space with the one or more work queues) that may be required are available. Accordingly, the embodiments of the present application may provide a flexibility in how events and/or dependencies are configured that trigger an automated operation, function, or process and therefore, allow for the generation of more complex programs or applications that use greater resources or resources more efficiently, which improves an operating efficiency of the one or more systems described herein by reducing a number of events that need to be generated in order to perform some action.

2. Intelligence Processing Computing Architecture

Figure 1A:
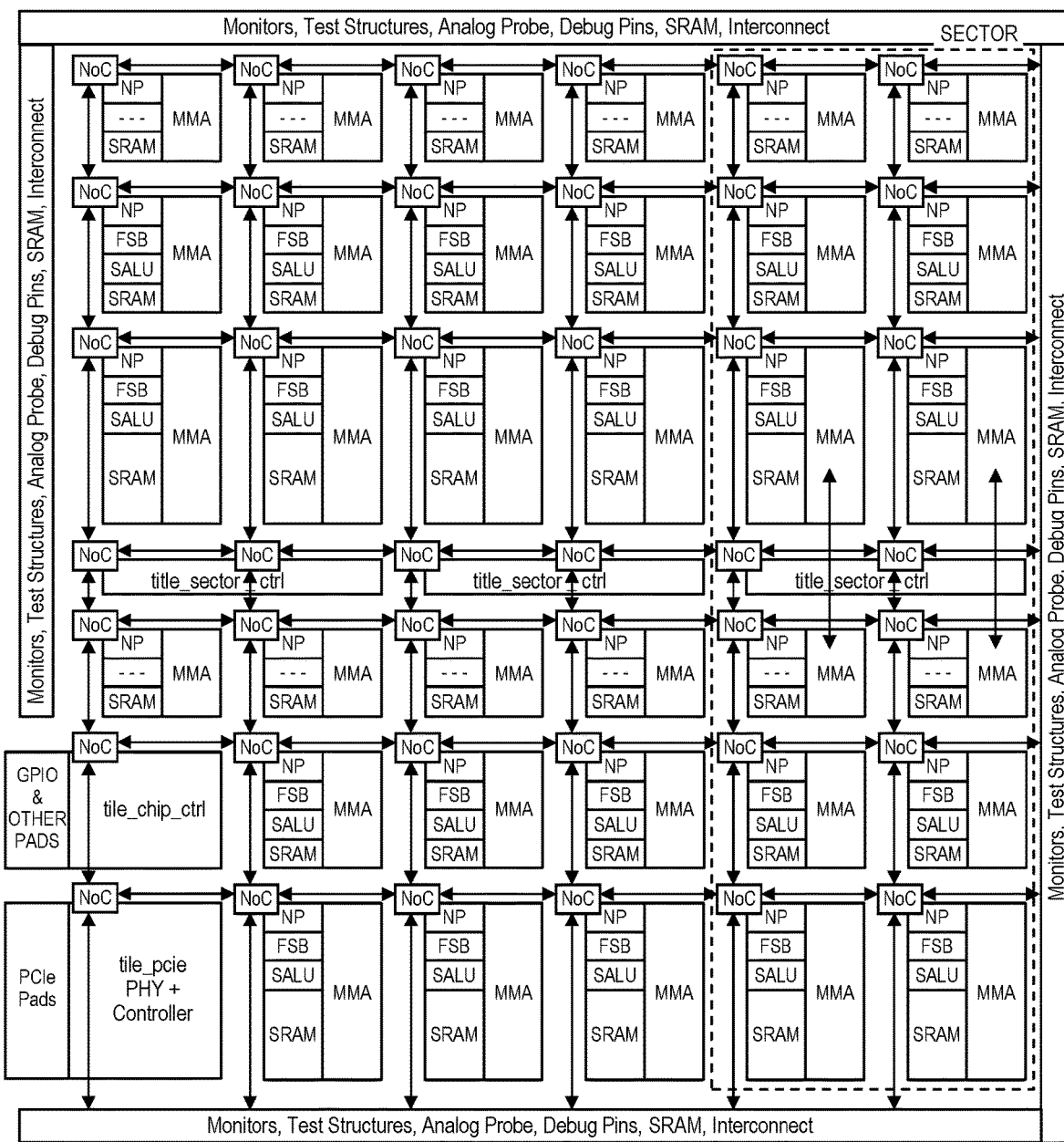

As shown in FIGS. 1-1A, an intelligence processing computing architecture 100 (or alternately referred to herein as an intelligence processing integrated circuit 100) for processing computationally-intensive programs and/or applications (e.g., machine learning applications, neural networks, etc.) includes an intelligence processing array 105 that includes a plurality of intelligence (computing) processing (tiles) units 110, a network on chip system 120 that includes a plurality of network-on-chip routers 125, an integrated circuit controller circuit 130, tile sector controller circuit 140, and a serial connection bus 150. Preferably, each of the plurality of intelligence processing units 110 includes a matrix multiply accelerator 111 (may also be referred to herein as an accelerator circuit), a computer processing circuit (e.g., a microprocessor, a nano-processor, or the like) 112, a flow scoreboard (token-based governance) module 114, a single instruction multiple data (SIMD) unit 116 (e.g., streaming arithmetic logic unit or the like), and a local buffer (e.g., static random access memory (SRAM) or the like) 118. Additionally, in one preferred embodiment, each of 130, 140, and 150 may include a computer processing circuit 112, a flow scoreboard module 114, a SALU 116, and a local buffer 118. In one or more embodiments, the local data buffer 118 may sometimes be referred to herein as an on-tile memory or on-tile buffer indicating that the local data buffer 118 may be arranged within an intelligence processing tile 110 and in direct communication with various or one or more circuits, components, and/or modules within the intelligence processing tile 110. FIG. 1A includes a further detailed embodiment of the intelligence processing computing architecture 100 and includes additional peripheral interconnects for interfacing with the intelligence processing array 105. For instance, test structures, monitors, analog probes, and/or any suitable peripheral device may be connected along or arranged along the periphery of the intelligence processing array 105 of the intelligence computing architecture 100.

While in one or more preferred embodiments an intelligence processing unit 110 may include a matrix multiply accelerator 111, a computer processing circuit 112, a flow scoreboard module 114, a SIMD unit 116, and a local buffer 118, it shall be noted that an intelligence processing unit 110 may include any suitable combination of circuits and modules and therefore, may exclude one or more of the aforementioned circuits and modules and/or may include any combination of the aforementioned circuits and modules without meaningfully departing from the scope of the inventions described in the present application. For instance, in some embodiments, an intelligence processing unit no may include or consist of a flow scoreboard module 114 and a local buffer 118 (SRAM) without computational circuitry or the like (e.g., computer processing circuit 112). In another example, an intelligence processing unit 110 may include or consist of a flow scoreboard module 114, a local buffer 118 (SRAM), and an off-chip interface (e.g., USB, PCIe, HDMI, MIPI-CSI, I2C, ethernet, Bluetooth, and/or any suitable off-chip interface component).

Additionally, or alternatively, while processing within the architecture 100 may include analog processing components or the like, it shall be noted that the embodiments of the architecture 100 may also enable digital processing with any suitable circuitry including, but not limited to, embedded Field Programmable Gate Arrays (eFPGA), Systolic arrays, floating point units, and/or the like.

The intelligence processing array 105 (intelligence accelerator) preferably includes the plurality of distinct intelligence processing units 110 that may function to work in cooperation to execute a computationally-intensive application or the like. In some embodiments, the intelligence processing array 105 may function to define one or more intelligence processing pipelines that enables a processing of raw input data and/or data from an upstream device or process to a final output state. In such embodiment, each stage (e.g., by one or more disparate intelligence processing units 110 or the like) of the intelligence processing pipeline may be defined by a disparate intelligence processing unit 110 that may be specifically programmed to execute a fraction of an application or program. Each of the disparate intelligence processing units 110 of the intelligence processing array 105 preferably functions to operate or compute independently of other or heterogeneous intelligence processing units 110 within the intelligence processing array 105. Accordingly, because each stage of an intelligence processing pipeline may be configured with its own processing section (e.g., intelligence processing unit 110), each intelligence processing pipeline may function to processing input data independently along each stage within the pipeline thereby enabling considerable efficiencies in processing input. That is, asynchronous processing of data or raw input data may be achieved based on the independent processing and/or computations of respective intelligence processing units 110.

Additionally, or alternatively, each of the one or more intelligence processing pipelines defined within the intelligence processing array 105 may be flexibly configured to enable the execution of disparate (non-dependent) applications or programs within the single array 105 or flexibly configured to enable the execution of disparate sections of a single application or a single program along various intelligence processing units no within the array 105. For instance, a first neural network application may be programmed along a first section of the intelligence processing array 105 that includes a first collection of intelligence processing units 110 and a second neural network application may be programmed along a second section of the intelligence processing array 105 that includes a second disparate collection of intelligence processing units no. In a second example, a single computationally-intensive application (e.g., a neural network or the like) may be partitioned into sub-applications (or programs) and each section programmed to a different intelligence processing unit 110 within an array 105. Additionally, or alternatively, in this second example, multiple sections of an application or multiple sub-applications may be programmed to a same intelligence processing unit no. In yet another example, a plurality of intelligence processing units 110 may be conglomerated to perform one or more sub-sections of a single application or a single program. That is, individual intelligence processing units no may be used to implement only a section of an application or a program and thus, the entirety of the application or the program is handled by a plurality of intelligence processing units 110 that each process only a section of the overall application or program. It shall be noted that the integrated circuit array 105 and/or each intelligence processing units 100 may function to compute the multiple distinct applications and/or the multiple distinct partitions of a single application or single program in parallel (i.e., at the same time), contemporaneously (i.e., processing within a common time period, nearly the same time, etc.), or synchronously (i.e., processing independently of other processes and/or processing units 110). Additionally, it shall be noted that any suitable and/or type of application or program may be partitioned along the intelligence processing array 105 including applications and/or programs that may be partitioned into multiple operational stages that may have dependencies that can be represented as tokens.

The plurality of intelligence processing (tiles) units 110 preferably function to execute an application or a program against some input data received from an upstream device or an upstream layer, such as a buffer or another intelligence processing unit 110. As mentioned above, each of the plurality of intelligence processing units 110 includes a matrix multiply accelerator (e.g., a data processing circuit, or the like) 111, a computer processing circuit (e.g., a microprocessor) 112, a flow scoreboard module 114, a SIMD unit 116, and local data buffer 118 that enables each of the plurality of intelligence processing units 110 to accomplish and/or complete a processing of input data to output data and/or execute an application or program.

Each of the plurality of intelligence processing units 110 preferably functions to pull and/or accesses input data from its local buffer 118, compute against the input data at the matrix multiply accelerator 111 and output the results (output data) of the computation against the input data back into its local buffer 118 (or possibly to a local buffer of a downstream component or processing section).

In additionally and/or alternative embodiments of the present application, one or more distinct subsets (i.e., two or more) of the plurality of intelligence processing units 110 of the intelligence array may be clustered and/or conglomerated into a smaller chip (e.g., a chiplet, a system-in-a-package (SIP), 3D packaging, or the like) relative to the overall architecture 100. In such embodiments, a chiplet may be composed within the overall architecture 100 to make a full and/or independent chip. A technical benefit of such embodiments enables an enhanced level of customization of the architecture to be achieved.

In yet further embodiments, multiple integrated circuit architectures 100 may be combined and/or packaged together in a multi-chip architecture. In such embodiments, the multiple architectures 100 may be composed at a system or circuit board (panel) level. The interconnections between the multiple chips may be made using any suitable interconnect technique or interface, including PCIe or specially created bridge interfaces.

The flow scoreboard module 114 is preferably implemented by a combination of one or more computing processing circuits and flow scoreboard sub-modules. Additionally, the flow scoreboard module 114 may include a plurality of interfaces for implementing a flow control of data flowing through the one or more intelligence processing pipelines and a control of the execution of programs or the applications being handled by the one or more intelligence processing pipelines of the intelligence processing array 105.

In a preferred embodiment, the flow scoreboard module 114 may include a configuration interface, a token interface, and a notification interface. The configuration interface of the flow scoreboard 114 may be used to read and write an internal state of the flow scoreboard module 114, such as to program trigger conditions. The token interface of the flow scoreboard 114 may enable the intelligence integrated circuit 100 to present tokens to the flow scoreboard 114. In response to the presentation of a token via the token interface, the flow scoreboard 114 may function to update its internal state, and when necessary, update the notification interface according to token parameter values (e.g., token count values or the like, as discussed in further detail in the method 300) and a configuration of the flow scoreboard 114. The notification interface of the flow scoreboard may be implemented by the flow scoreboard module 114 to indicate to the intelligence integrated circuit 110 that one or more conditions (or prerequisites) for executing one or more programs have been satisfied. It shall be noted that the notification interface of the flow scoreboard module 114 may function to trigger any number of operations within the intelligence integrated circuit 110, for example, data transfer without an explicit program execution.

It shall be noted that the configuration interface, token interface, and/or notification interface may be implemented in any suitable manner including with a combination of modules executed by one or more processing circuits, such as a microprocessor.

The network on chip system 120 that includes a plurality of network-on-chip routers 125 that function to establish a communication network between the disparate components of the intelligence integrated circuit 100. In one embodiment, each of the chip routers 125 may include dedicated input and output links for receiving and transmitting communications in the North, South, East, and West directions along the architecture 100 and specifically, within the intelligence processing array 105. In some embodiments, the network on chip system 120 enables each of the disparate intelligence processing units 110 to pass data between them, such that when one intelligence processing unit 110 completes processing input data to generate an output, the one intelligence processing unit 110 may function to pass the output via one or more of the network routers of the network on chip system to another intelligence processing unit and/or allow another intelligence processing unit 110 to grab the output data. As one example, the digital tokens and/or data packets may be carried along the plurality of network routers of the network on chip system 120.

The integrated circuit controller 130 preferably includes chip-level control logic, which includes boot logic, security features, clocking logic, and the like.

The tile sector controller circuit 140 preferably includes a high voltage portion or circuit of the intelligence processing computing architecture 100 that enables the reprogrammable non-volatile memories within the matrix multiply accelerator in.

The serial connection bus 150 preferably includes one of a universal serial bus (USB) port and a peripheral component interconnect express (PCI express) interface and/or any suitable high-speed. In a preferred embodiment, raw input data (e.g., raw image data or the like) and/or processed input data (e.g., from an upstream device, an upstream layer, etc.) may be received at the serial connection bus 150 and passed into the system via a primary or main buffer component. Additionally, or alternatively, input data received at the serial connection bus 150 may be passed either into a primary buffer of the intelligence processing integrated circuit 100 or directly into a local buffer 118 of an intelligence processing unit 100 via the network on chip system 120. Additionally, or alternatively, the primary buffer, which is sometimes referred to herein as a main buffer, may also be referred to as an off-tile (off-unit) memory or buffer. In particular, since the main buffer operating with the architecture 100 may be arranged remotely from and off of an intelligence processing tile 110, it may be considered an off-tile component.

Additionally, or alternatively, any suitable off-chip connection may be implemented for transmitting data into and/or out of an intelligence processing array 105 and/or throughout the intelligence integrated circuit 100. For instance, any suitable peripheral device including, but not limited to, an imaging device (e.g., a camera), a host system (e.g., a system on chip) or workstation, another intelligence integrated circuit, and/or the like.

Accordingly, it shall be noted that any type or kind of data including tokens may be passed along the serial connection bus 150 or other suitable off-chip connection/interface. For instance, data (e.g., results of computations or other outputs, etc.) from the intelligence integrated circuit 100 may be sent out to another device or system via the serial connection bus 150 or off-chip connection. Thus, a flow control, as described in the one or more embodiments herein, may be extended from the intelligence integrated circuit 100 to other devices, when operably connected or interfacing, in some manner. That is, in some embodiments, token-based flow control may be enabled between multiple intelligence integrated circuits 100 or between a device and host.

3. Intelligence Processing Method

As shown in FIG. 2, a method 200 automated and intelligent processing of data by an intelligence processing integrated circuit (e.g., circuit 100) includes receiving input data S210, loading input data to an intelligent processing tile S220, performing computations with the input data S230, generating tokens based on state data S240, and providing a final output S250.

S210, which includes receiving input data, functions to collect input data from one or more input sources. The input data collected in S210 may include any type or kind of data including image data, audio data, any suitable sensor data (e.g., temperature sensor data, pressure sensor data, proximity sensor data, infrared sensor data, motion sensor data, etc.) and the like. In a preferred embodiment, S210 may function to collect image data from a device operating one or more image capturing devices or image capturing sensors (e.g., a still image or video camera). Accordingly, in such preferred embodiment, S210 may function to collect or receive continuous streams of image data from the one or more image capturing devices or image capturing sensors.

Additionally, or alternatively, S210 may function to collect the input data using any suitable input port and preferably, a high-speed communication bus. For instance, S210 may function to collect the input data using a universal serial bus (USB) port. Alternatively, S210 may function to collect the input image data using a high-speed serial computer expansion bus, such as peripheral component interconnect express (PCIe) express or the like.

Additionally, or alternatively, S210 may function to collect the input data from one or more upstream input sources. The one or more upstream input sources may include another integrated circuit layer of a system (e.g., the intelligent processing integrated circuit 100) implementing the method 200, an external input sensor (e.g., a camera, etc.), a switch, an off-chip device or circuit (e.g., off-chip memory, etc.), and/or the like.

Additionally, or alternatively, S210 may function to store the input data at one or more memory storage devices. Preferably, S210 functions to store the input data at a main or primary buffer of a system implement the method 200. The primary buffer may include one or more physical memory storage devices from which the method 200 passes or loads data to one or more processing elements.

S220, which includes loading input data to an intelligent processing pipeline, functions to load input data one or more components of a data processing pipeline of an intelligent processing circuit or the like. In a preferred embodiment, S220 may function to distribute loads of input data from a primary input data buffer to one or more input data processing sections (intelligent processing tiles) of an intelligent processing integrated circuit or the like. In such preferred embodiment, S220 may function to automatically load input data from the primary input data buffer to one or more local buffers of the one or more input data processing sections.

In a preferred embodiment, S220 may function to implement a token-driven or token-controlled loading of data for automatically loading input data from the primary input data buffer to the one or more local buffers of the processing sections. That is, in such preferred embodiment, the data loading performed in S220 is based on an identification of a token, a receipt of a token, and/or another similar event or occurrence that triggers a passing of some amount or portion of data from the primary data buffer to a local data buffer of a processing section.

The one or more tokens implemented within the method 200 may include any suitable and/or type of digital token including, but not limited to, a flow scoreboard/flow control token, interrupt tokens, timers+tokens, and/or the like. In a preferred embodiment, a flow scoreboard token may be presented to a flow scoreboard module and used as a signal for updating an internal state of the flow scoreboard module including incrementing one or more counters associated with one or more of a token-count table and the program control table.

In a preferred embodiment, an interrupt token may be presented to a microprocessor or nano-processor of an intelligence processing tile or unit. In such embodiments, the interrupt token preferably functions to cause a processing circuit of an intelligence processing unit to accept an interrupt, which operates to stop or pause a process of an intelligence processing unit and take up a payload or work processing command associated with the interrupt token. Accordingly, an interrupt token may be generated according to a different token generation process than a flow scoreboard token. For instance, a flow scoreboard token may be generated based on a state of one or more local components of an intelligence processing pipeline or the like whereas an interrupt token may be generated according to circumstances relating to systems, components, and/or the like outside of the intelligence processing pipeline.

Additionally, or alternatively, a type of interrupt token and associated function pointer may preferably be included in a payload of the interrupt token. In one example embodiment, an interrupt token may be implemented as a tail token which may be appended to a data packet or the like in which the data payload of the packet is a program or application and the tail token comprising the interrupt token causes an automatic execution of the program or application by the intelligence processing unit or processing section of an intelligence processing pipeline.

Accordingly, a further token type may include a tail token, which may be appended to a data packet, work packet, and/or suitable packet (as partly described above) and in a preferred embodiment, operate as a synchronization mechanism. In some embodiments, a tail token may be either of a read tail token or write tail token, which may be associated with a read stream or a write stream, respectively. Accordingly, once a read or write is executed by intelligence processing unit, the read tail token or the write tail token may be processed, therefore, serving as a synchronization mechanism. That is, a processing of the read or write tail token operates as a signal to a downstream device or process or a signal to some component of the intelligence integrated circuit that the respective read or write function was successful completed thereby triggering an automatic execution of one or more downstream functions or operations, etc.

It shall be noted that while, in some embodiments, a tail token may be appended to a data packet or work item, in other embodiments, a token may travel independently of a data packet and/or work item.

Yet a further token type or variation of a flow control token may include a timer+token. That is, in some embodiments, a timer may be modified to include an issuance of token of any type. That is, at an expiry or expiry event of a timer one or more of an interrupt token or a flow control token and/or the like may be automatically generated and/or released by the system implementing the method 200 and/or the method 300.

Preferably, the one or more tokens that trigger the data loading in S220 are generated by a downstream processing section or the like. In a preferred embodiment, a processing section of the intelligent processing integrated circuit may function to identify a state of one or more local buffers (or any memory storage) within or associated with the processing section and based on an identified state of the one or more local buffers, generate a token that is passed upstream to the primary data buffer or a processing circuit (or controller) associated with the primary data buffer. The generated token may generally function to indicate or identify the state of the one or more local buffers associated with the processing section. Accordingly, the one or more local buffers associated with a processing section may have one or more states including, for example, a loaded state or an unloaded state or a busy state or un-busy state, etc. In the case that the token passed to the primary data buffer indicates that the one or more local data buffers of a processing section is in an unloaded state or the like, S220 may function to automatically pass or load some amount of input data from the primary data buffer to the one or more local data buffers associated with the processing section. Alternatively, if the token indicates that the one or more local data buffers are busy or in a loaded state, S220 may function not to pass or load data to the one or more local data buffers.

It shall be noted that while in a preferred embodiment, a downstream device may function to generate and pass the tokens that triggers a data loading operation from the data buffer to one or more processing sections of the intelligent processing pipeline of the intelligence processing integrated circuit, any upstream, downstream, or lateral device (e.g., a token-generating device not arranged along the stream, etc.) may function to generate a token that causes input data to be loaded from the primary data buffer or to pass from any upstream local data buffer or processing circuit to the one or more downstream processing sections of the intelligent processing pipeline. It shall be noted that while the intelligence processing integrated circuit may generally function to load data from an upstream component to a downstream component and function to pass a token from downstream device to an upstream device, the converse directional loading and the converse directional token passing may be implemented by the intelligence processing integrated circuit.

Additionally, or alternatively, the intelligence processing integrated circuit may function to skip or pass over one or more components along a stream of a data processing pipeline, such that input data may be handled in a nonsequential manner along the data processing pipeline or such that a token that is passed upstream may pass beyond an immediate upstream component of the intelligence processing integrated circuit to a component further upstream in the data processing pipeline.

Additionally, or alternatively, S220 may function to load input data in segments from the primary data buffer to the one or more processing sections. That is, in some embodiments, S220 may function to partition into segments the input data load stored at the primary data buffer and load to the one or more local data buffers of a processing section. The partitioned segment of input data from the primary data buffer may be referred to herein as an input data slice or a slice of input data because, in some embodiments, only a portion or slice of the entire input data at the primary data buffer is loaded at a time or multiple slices of a corpus of input data may be loaded at the same time.

A size of the input data slice that may be partitioned and loaded to a local data buffer may be based on a storage capacity of the local data buffer. That is, the system implementing the method 200 may function to decompose a relatively large-size input data into smaller portions or data packets that are more easily consumed and/or received by the one or more circuit components (e.g., a local data buffer, a matrix multiply accelerator, etc.) within a data processing pipeline. In some embodiments, a local data buffer associated with a processing section may have a smaller storage capacity than a primary data buffer. For example, in the case of a stream of input image data or the like, the primary data buffer may have sufficient storage capacity to store the entirety of the stream of input image data whereas a local buffer may only have sufficient storage capacity to store a fraction of the stream of input image data. In such embodiments, S220 may function to identify a storage capacity of a local data buffer of a processing section and partition a slice of input data from the buffer that is of equal or smaller size that a storage capacity of the local data buffer.

Additionally, or alternatively, a size of the input data slice that is loaded from the primary data buffer to the one or more local data buffers of a processing section may be based on a predetermined value or a dynamically calculated value that defines a maximum or minimum size of the slice of input data.

Additionally, or alternatively, in some embodiments, a processing circuit operating the primary data buffer may be specifically programmed to operate or pass data from the primary data buffer to a destination based on a receipt or identification of a predetermined number of tokens or based on an identification of one or more predetermined events. In such embodiments, the one or more tokens may include source data that identifies a source of the token and additionally, or alternatively, include destination data that identifies a destination for sending the token from the primary data buffer and state data of the destination. The state data may relate to or include an availability or an unavailability and/or a capacity of a computing resource at the destination.

S230, which includes processing the input data, functions to process the input data at one or more processing sections (e.g., intelligent processing tiles). In a preferred embodiment, S230 may function to access the input data or the input data slice from a local buffer specifically coupled to or associated with a computing element of an intelligent processing tile. Preferably, the intelligent processing tile includes a matrix multiply accelerator or any suitable computing circuit or the like for processing the input data access from the local buffer of the intelligent processing tile. In such embodiments, the processing section may function to compute the input data against one or more matrices of weights or coefficients (of a neural network algorithm or the like) and output a result of the computation into the local buffer of the intelligent processing tile.

In some embodiments, the intelligence processing pipeline of an integrated circuit implementing the method 200 includes a plurality of intelligent processing sections or tiles. Preferably, a disparate program may be mapped to each of the plurality of intelligent processing tiles. For instance, a computationally intensive program or the like, such as a neural network application, may be split into disparate programs (e.g., program A+program B+program C=Neural Network Application) and each of the disparate program parts of the computationally intensive program may be mapped to a different intelligent processing tile along the intelligent processing pipeline, such as described in U.S. Provisional Application No. 62/607,203, which is incorporated herein in its entirety by this reference. Preferably, each disparate program may be assigned in serial order to the plurality of intelligent processing tiles within the intelligent processing pipeline. That is, when configuring the intelligent processing pipeline, the disparate program part that would typically operate first on input data may be assigned to the first intelligent processing tile in which the plurality of intelligent processing tiles are arranged in a linear, serial order or the like. Accordingly, in some embodiments, a plurality of disparate intelligent processing tiles implementing disparate programs may be arranged in a linear manner (or any suitable manner) to process input data from the primary data buffer to a final output thereby defining the intelligent processing pipeline (e.g., primary data buffer+a plurality of intelligent processing tiles, etc.).

Additionally, or alternatively, multiple programs or multiple applications may be mapped to a single intelligent processing tile, such that multiple, disparate computationally intensive programs or applications may be run on a same intelligent processing tile.

Accordingly, once the input data is accessed from the local data buffer and passed into the computing element of the intelligent processing tile, S230 may function to process the input data according to a program mapped to the computing element. Contemporaneously with the processing of the input data and/or with passing of the input data to the computing element of the intelligent processing tile, state data for each of the local buffer and the computing element may be generated. The state data, as discussed above, preferably relates to one or more of a state of busyness, a state of occupancy, a state of capacity, state of utilization (e.g., 0%, 50%, 100% utilization), and/or a state of activity of one or more computing resources of an intelligent processing tile. Accordingly, the state data may include state data of the local buffer, state data of the computing element (e.g., the matrix multiply accelerator), any component of the integrated circuit, and/or any operating element of the intelligent processing tile (and/or any computing resource along the intelligent processing pipeline).

S240, which includes generating tokens based on state data, functions to identify state data of the one or more computing resources of an intelligent processing tile and generate one or more tokens based thereon. As discussed above, the one or more generated tokens may function to facilitate a plurality of automatic data movement/storage and/or input data processing actions within the intelligent processing pipeline. In some embodiments, the tokens may be generated by a dedicated token generator circuit of an integrated circuit implementing 200. Additionally, or alternatively, some or all of the tokens may be generated by any of the computing elements along an intelligence processing pipeline.

Accordingly, based on a detected or identified state of the one or more computing resources of an intelligent processing pipeline, S240 may function to generate tokens that may be passed to an upstream device or a downstream device for triggering an operation of the upstream or the downstream device. That is, the one or more tokens generated in S240 may function to notify any upstream or downstream device in the intelligent processing pipeline regarding a state of an intermediate computing resource. For instance, once a computing element of an intelligent processing tile accesses the input data from its local buffer, a first token may be generated regarding a state of the local data buffer (e.g., the local buffer has capacity or its empty) and a second token may be generated regarding a state of the computing element (e.g., the computing element/MMA is occupied, being utilized, etc.). In such example, the first token that is generated may indicate that the local buffer is now empty and ready to receive additional input data from one or more of another local buffer (e.g., an output buffer) of a disparate intelligent processing tile and/or from the primary data buffer. Thus, the first token may be passed to an upstream computing resource, such as an output buffer or the primary data buffer. Further with respect to this example, the second token may indicate that the computing element of the intelligent processing tile is now actively processing (e.g., busy state, utilized state, etc.) input data and thus, the token may include state data indicating that the computing element is not available or busy and therefore, cannot accept additional work from its local data buffer or the like.

In yet another example, once the computing element of an intelligent processing tile completes a processing of input data and outputs the processed data to a downstream local buffer or other memory storage device, a first token may be generated that identifies a current state of the computing element as available and the token may be passed to a local buffer of the intelligent processing tile, which may trigger the local buffer to automatically pass any input data stored thereon to the computing element for processing. Once the local input data buffer of the intelligent processing tile is emptied, a second token (simultaneously or contemporaneously with the first token) may be generated indicating that the local buffer is emptied and the token passed to an upstream device (e.g., another local buffer or the primary data buffer) indicating a state of the local buffer and triggering an automatic passing of input data into the local buffer. Additionally, a third token may be generated for the downstream local buffer (or the like) of a downstream intelligent processing tile that received the output of the computing element. The third token may be passed to downstream computing element associated with the downstream local buffer indicating that the downstream local buffer has input data ready to be passed to the downstream computing element for processing.

Accordingly, anytime a state of a computing resource of an intelligent processing tile is adjusted or changed, S240 may function to automatically generate a token identifying a current state of the computing resource and correspondingly, pass the token to another relevant computing resource that may operate to react, in some manner, to the receipt of the token in some manner.

It shall be understood that the tokens may be passed to and/or generated by any suitable token management or computing resource within and/or associated with the intelligent processing pipeline including a central token repository and/or token processing circuit or the like.

Additionally, or alternatively, S240 may function to only publish state data of the one or more computing resources of an intelligent processing tile and/or pipeline and based on the published state data, one or more computing resources may automatically function to pass input data and/or output data to one or more downstream devices for storage and/or processing.

In some embodiments, S220 through S240 may additionally, or alternatively be executed multiple times in a looping (e.g., asynchronous, in parallel) manner before a final output is generated and produced in S250.

S250, which includes providing a final output, functions to provide a final output of the processing of the input data by the intelligent processing pipeline. In some embodiments, one or more final tokens are generated by the one or more computing resources of the intelligent processing pipeline indicating that all input data has been processed at each stage of the intelligent processing pipeline and that no input data remains to be processed for the application, S250 may function to pass a token or other notification to an output circuit to generate a final output and/or readout circuit to read a final output. In some embodiments, the final output may be based on an aggregation of input data slices processed through the intelligent processing pipeline.

4. Automated Data Flow and Intelligent Processing Mechanism (FSB)

Figure 3:
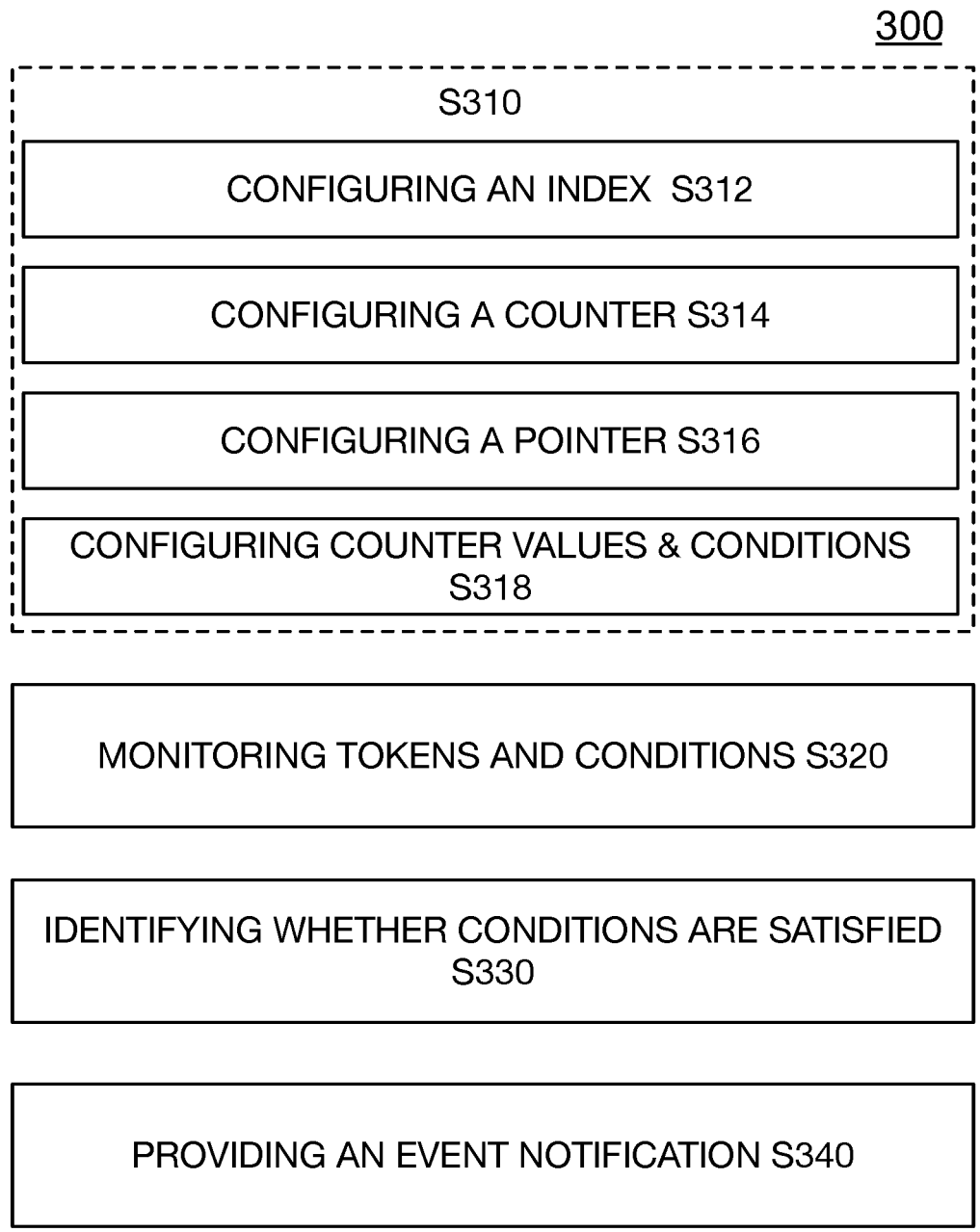
FIG. 3 illustrates a method automated data flow and processing with an integrated circuit in accordance with one or more embodiments of the present application.

As shown in FIG. 3, a method 300 for configuring and implementing an automated data flow control process includes configuring a first token-controlled event data structure and a second token-controlled program control data structure S310, monitoring token requirements S320, identifying whether processing conditions are satisfied S33o, and providing an event notification S340.

The method 300 generally functions to automate a flow of input data and corresponding storage and/or processing thereof by specifying prerequisites for one or more processes within an intelligence processing integrated circuit or the like based on occurrences of events and/or preferably, based on tokens required for one or more operations and/or actions by computing resources associated with the intelligent processing integrated circuit. In some embodiments, the method enables bi-directional conditioning between upstream, intermediate, and downstream devices within the intelligence processing integrated circuit that causes one or more components of the upstream, intermediate, and/or downstream devices to interact with each other by automatically performing one or more of passing input data, storing input data, processing the input data, passing an output derived from the input data, and/or the like based on the generation and/or receipt of tokens. That is, a circuit component along an intelligence processing pipeline may operate to communicate and/or interact with other circuit components arranged either upstream or downstream of the circuit component.

Additionally, or alternatively, the method 300 enables a tracking or management of tokens transmitted and/or received between the disparate computing resources within the intelligent processing integrated circuit to determine when any prerequisites for an automatic action by a computing resource has been satisfied.

Accordingly, the method 300 may function to implement in some embodiments a multi-level token-based governance structure in which at least a first and a second token-based control structure may be used to automate a flow control within a system and/or chip architecture implementing the method 300. In such embodiments, a first level table (i.e., a first token-based control data structure) may function to track and/or monitor one or more distinct token types and generate a different type of token that the second-level table (i.e., a second token-based control data structure) consumes and/or uses for controlling an execution of one or more programs and/or applications managed by the second-level table. Thus, in such embodiments, the first-level table receives tokens and produces tokens and the second-level table receives tokens and produces commands to execute programs and/or applications.

4.1 Configuring Token-Based Control Data Structures

S310, which includes configuring a first token-based data structure and a second token-based data structure, functions to establish token-based data structures that operate in cooperation to control automated data flow and/or automated data processing in a system (e.g., an integrated circuit, intelligent processing pipeline, and/or the like). The first and the second token-based data structure may be any suitable data structure and/or value storing structure (e.g., a list, a table, an array that allows for a management and/or tracking of digital tokens. Preferably, the first and the second token-based data structure are preferably reference tables that function to store token data including token values, token identification, token parameters, program parameters, and token count values as well as one or more conditions that may be triggered and/or satisfied by the tokens. The second token-based data structure may additionally operate to cause an execution of one or more programs or applications based on count values of it one or more token counters and token-based parameters or triggers.

While it may be generally described that a first token-based data structure and a second token-based data structure may be configured and/or implemented within the method 300 or other suitable process (e.g., the method 200) described herein to operate interdependently, it shall be noted that the second token-based data structure may function to operate independently of the first token-based data structure and/or without dependence on the first token-based data structure. For instance, in some embodiments, the second token-based data structure may operate to receive tokens directly from one or more token sources (or token generators) rather than a token produced by the first token-based data structure.

In a preferred embodiment, the first token-based data structure preferably includes a token-count table that stores a running count of tokens (e.g., flow scoreboard or flow control tokens) received. Configuring the first token-based data structure in S310 preferably includes configuring a token index and/or a token indexing functionality (S312) for the first token-based data structure that enables the first token-based data structure to index tokens managed and/or tracked thereby by a token identification value or the like. A token identification value may include any suitable value that functions to identify and/or distinguish disparate tokens. For instance, a token identification value may be any combination of characters, symbols, numbers, spaces, etc. including a string of numbers, a string of letters, a combination of characters and numbers, and the like.

Additionally, or alternatively, S310 may function to configure the first token-based data structure to include a token counter functionality (S314) (with a token counter module or the like) that enables the first token-based data structure to count disparate types of tokens received in or by a system implementing the method 200 and/or the method 300. That is, in some embodiments, the token counter may function to count to a value of tokens of a same type (e.g., a same token identification value, a same token configuration or parameters, or the like). That is, the token counter may function to keep a running count for each type or kind of token received. Additionally, or alternatively, the token counter may function to count to a value (e.g., a positive value, a negative value, and/or zero) of condition-specific tokens. That is, for one or more specific conditions associated with the first token-based data structure, the token counter may function to keep a running count of tokens according to a specific condition that the token count may affect or otherwise satisfy when a required token count is met for the specific condition.

Additionally, or alternatively, S310 may function to configure a pointer and/or a pointer functionality (S316) within the first token-based data structure that functions to point to an entry in a second token-based data structure. In a preferred embodiment, the pointer within the first token-based data structure may be configured such that the pointer points to an entry in a second token-based data structure for which a token counter condition is a prerequisite. That is, when the token counter condition is satisfied or triggered, the pointer functions to automatically reference a program entry within the second token-based data structure and functions to cause an update of one or more values within the second token-based data structure, cause an execution one or more programs associated with the token-based data structure, and/or obtain data associated with the referenced entry.

Similarly, S310 may function to configure the second token-based control data structure to index and count tokens according to token identifiers or the like. However, S310 preferably configures the second token-based control data structure to index programs or any suitable application or computer code by their respective identifiers (e.g., by program identifiers). The second token-based control data structure is preferably a program control table that may function to identify one or more programs that may be controlled (e.g., activated/deactivated or the like) based on tokens (token counts) or any suitable event-based triggering scheme. Accordingly, the second token-based data structure, in some embodiments, may include a list or multiple programs indexed according to their program identifiers and corresponding token count value as well as a corresponding condition that can be satisfied or dissatisfied by its corresponding token count value.

S310 may additionally, or alternatively function to set conditions and corresponding token counter parameters and/or values (S318) for each of the first and the second token-based control data structures. Preferably, S310 functions to set counter values within the first and/or the second token-based control data structure using software-programmable configuration bits. For instance, if the token-based control data structure comprises a table, S310 may function to set a software-programmed configuration bit value within an entry field of the table that specifies a counter value that satisfies a counter trigger condition (e.g., positive, negative, or zero).

Likewise, S310 may function to set counter trigger conditions within each of the first and the second token-based control data structures. The condition may be set to any suitable value. For instance, the condition may be set to any specific positive or negative number value or zero. Preferably, S310 may function the condition to positive, negative, or zero, such that if the counter value is any positive value, any negative value, or zero, the set condition may be satisfied. Accordingly, rather than granularly setting a specific number value as a trigger condition, S310 may function to coarsely define the condition as positive, negative, or zero; meaning if a positive or negative number is detected irrespective of its value, a trigger condition may be satisfied. For instance, if a trigger condition of positive (>0) is set in the first data structure, when a token counter value corresponding to this condition exceeds zero and is positive, the condition is triggered, and some action is taken in response to satisfying the condition. A technical benefit coarsely configuring the conditions with positive, negative, or zero is that in mixed-signal computing systems that may operate and/or perform calculations based on current values or current outputs, these systems can more easily produce the conditions in which either some positive current value, some negative current value, or zero current value is generated as a token or to build a token (e.g., a summation of current values over time to achieve a positive, negative, or zero value).

S310 may function to additionally configure the first token-based control data structure with pointer data and pointer functionality (S316) thereby enabling the first token-based control data structure to controllably interact with the second token-based control data structure. In a preferred embodiment, S310 may function to set a pointer for each token identifier entry indexed by the token-based control data structure. The pointer may be any suitable programming language object or the like that stores a memory address of another value located in the second token-based control data structure stored in memory.

Accordingly, in some embodiments, when an update to a token count value in the first token-based control data structure results in a corresponding token counter condition being satisfied (i.e., transitioning from not satisfied to satisfied), the pointer for the first token-based control data structure enables a corresponding entry (e.g., token count value) in the second token-based control data structure to be accessed, and the entry's count incremented (or decremented) or the like. Thus, the one or more pointers configured for each token identifier entry of the first token-based control data structure preferably references a location in the second token-based control data structure thereby indicating to the second token-based control data structure that a condition affecting an entry (token count) value has been satisfied in the first token-based control data structure.

S310 may additionally or alternatively function to configure a notification interface that enables the first and/or preferably the second token-based control data structure to notify and/or inform a system implementing the method 300 that an update to counter values and/or conditions has occurred in of either of the first and/or second token-based data structure. Accordingly, the notification interface functions to indicate to the system that the prerequisites for one or more programs have been satisfied to enable an execution or termination of an operation of the one or more programs. For example, if the second token-based control data structure comprises a program control table that controls multiple programs or the like, when an update to the program control table entry counter value causes a program trigger condition to transition from not satisfied to satisfied, the notification interface may be updated to reflect the transition and further, used to announce the update to a system implementing the program control table.

It shall be noted that while the flow scoreboard module or the token-based governance module may preferably implemented with at least two distinct token-based control data structures (i.e., token-controlled event data structure and token-controlled program control data structure), as described above, in some embodiments, the method 300 and/or the system 100 or the like may function to implement a single token-based control data structure or table in which any or all of the above data structure entries, indexes, trigger conditions, and/or counters and the like may be configured. That is, in one or more embodiments, a single-level or unified token-based governance module or token-controlled governance data structure may be implemented for automating a flow control data and/or processes of a system implementing the method 300 and/or the method 200. In such embodiments, the single-level token-based governance module may function to implement a predetermined and/or fixed number of token counters and associated program control trigger conditions. Accordingly, in one embodiment, the single-level token-based governance module may function to track a plurality of distinct tokens (e.g., tokens associated with distinct token identifiers) for controlling an execution of a plurality of distinct programs and/or applications. In one example, for each distinct token identifier, the single-level token-based governance module may include a column or line for a token counter that tracks a distinct token, a column or a line for an associated program trigger condition based on the counter value of the token counter, and a column or a line that distinctly identifies the program or application to be executed when or if the program trigger condition is satisfied by the counter value.

4.2 Implementing Token-Based Control Data Structures in a System

S320, which includes monitoring tokens and conditions of each of the first and/or the second token-based control data structures, functions to track dependencies for multiple computing applications or programs associated with one or more token-based control data structures. In some embodiments, each of the multiple computing applications may have varying conditions (or prerequisites) for automating some operation, execution, or performance by each respective computing application. It shall be noted that S320 may function to track dependencies for a single or multiple computing applications. Additionally, the dependencies that are tracked within the system by S320 may include any type of dependency in operation, execution, data movement, data storage, and/or any other event or occurrence in the system which may be a prerequisite or trigger to a conditional action.

In a preferred embodiment, the dependencies tracked in S320 may be specifically associated with one or more tokens that may be automatically generated in response to a detection of one or more dependencies or events within a system. Accordingly, monitoring and/or tracking of the dependencies may be tantamount to monitoring the one or more tokens that are generated by a system implementing the method 200 and/or the method 300.

Additionally, or alternatively, the tracking of dependencies may include counting and/or adjusting count values of any tokens observed within a system implementing the methods 200 and/or 300. That is, S320 may function to update count value within a first and/or a second token-based control data structure based on the token and/or dependencies tracking data. In some embodiments, count values of distinct counters of a token-based control data structure may be incremented upward or downward depending on whether it is an upstream or a downstream dependency or event that is being tracked. For instance, for an upstream dependency, a token counter may be decremented until a trigger condition is satisfied and for a downstream dependency, another token counter may be incremented until an associated trigger condition is satisfied. It shall be noted that the converse may be implemented in one or more embodiments.

As shown by way of example in FIG. 4, a token-count table (e.g., a first token-based control data structure) is provided with multiple programs including Program A and Program B that each have varying conditions for one or more operations and/or execution of each respective program. In such example, a prerequisite or condition for an execution of Program A may be that the system implementing the first token-count table should receive four (4) tokens bearing the token identifier (ID) "0"; four (4) tokens having the token ID "17"; and two (2) tokens having the token ID "18". Thus, in this example, the first-token count table may function to maintain, at least, token count data and corresponding conditions data that trigger one or more executions and/or operations of the respective programs identified within the first token-count table.

To accomplish this, the token-count table entries corresponding to token IDs "0" and "17" are programmed with initial count values of negative four (−4), and trigger condition configuration values specifying a trigger condition when the count value is greater than or equal to "0". The token-count table may additionally include an entry corresponding to token ID "18" that is programmed with an initial count value of negative two (−2), and a same trigger condition of when the count value is greater than or equal to "0". A program ID field within the token-count table for all three entries may be set to the program ID of program A.

Additionally, for an execution and/or an operation of Program B may require a receipt of two tokens with a token ID of "19" and four tokens with a token ID of "126". The token-count table entry for token ID 19 may be programmed with an initial value of negative two (−2), a trigger condition of greater than or equal to zero, and a program ID pointer to entry B (i.e., Program B) in a program table (referenced to below). The token-count table entry for token ID 126 may be programmed the same as token ID 19, except with an initial count value of −4. The program table entry for Program B may be programmed with an initial count value of −2, since it may be conditioned to wait on two token-count triggers from the token-count table, and a trigger condition of greater than or equal to zero.

Continuing with this example, S320 may function to monitor the tokens being generated by one or more components (e.g., upstream and/or downstream components) of a system (e.g., an integrated circuit, an intelligent processing pipeline, or the like) and when a token is detected (by a token detection circuit or the like), S320 may update (a token count or condition count) or create an entry corresponding to Program A within the first token-count table.

S330, which includes identifying whether one or more execution conditions are satisfied, functions to monitor token count values and condition count values at each of the first token-count table and the second program table (e.g., second token-based control data structure) and determine whether an execution condition for one or more programs have been satisfied. When implemented within an intelligence processing unit or similar integrated circuit, S330 may function to implement comparison circuitry or the like to determine whether one or more execution conditions for a given program identified within a program table are satisfied by comparing token count value data for each program to trigger condition data for the program.

As shown by way of example in FIG. 5, a program table (e.g., the second token-based control data structure) corresponding to the second token-based control data structure or table (discussed in the above-example in S320) may be configured with an index value that includes the program identifier for Program A and another index value that includes the program identifier for Program B. The program table may be further configured and/or initialized with a condition count value of negative three (−3) that corresponds to Program A, and a corresponding program trigger (execution) condition of count value greater than or equal to zero.

Accordingly, as each of the three token-count table entries "0", "17", and "18" satisfy their respective trigger conditions, the satisfaction of each of their respective trigger conditions may function to cause an increment of the count value for Program A at the program table. That is, in some embodiments, the satisfaction of the trigger condition of a respective entry at the token-count table that is associated with the Program A at the program table may cause a single increment (e.g., from −3 to −2) or a single decrement (e.g., from 3 to 2); however, it shall be noted that the program table may be configured with varying increment and/or decrement schemes (e.g., increment by 2, 5, 3, or any programmable increment). Once all three token-count conditions in the token-count table have been met or satisfied, the count value for Program A in the example program table will also have satisfied its condition.

S340, which includes providing an event notification, functions to use a notification interface to generate one or more notifications to dependent system component when a satisfaction of a trigger condition for an execution and/or an operation of a program or an application associated with the dependent system component is detected. Additionally, or alternatively, S340 may function to update a trigger-condition dependent status associated with respective program identifiers within a token-based control data structure (e.g., the second token-based control data structure).

Figure 6:
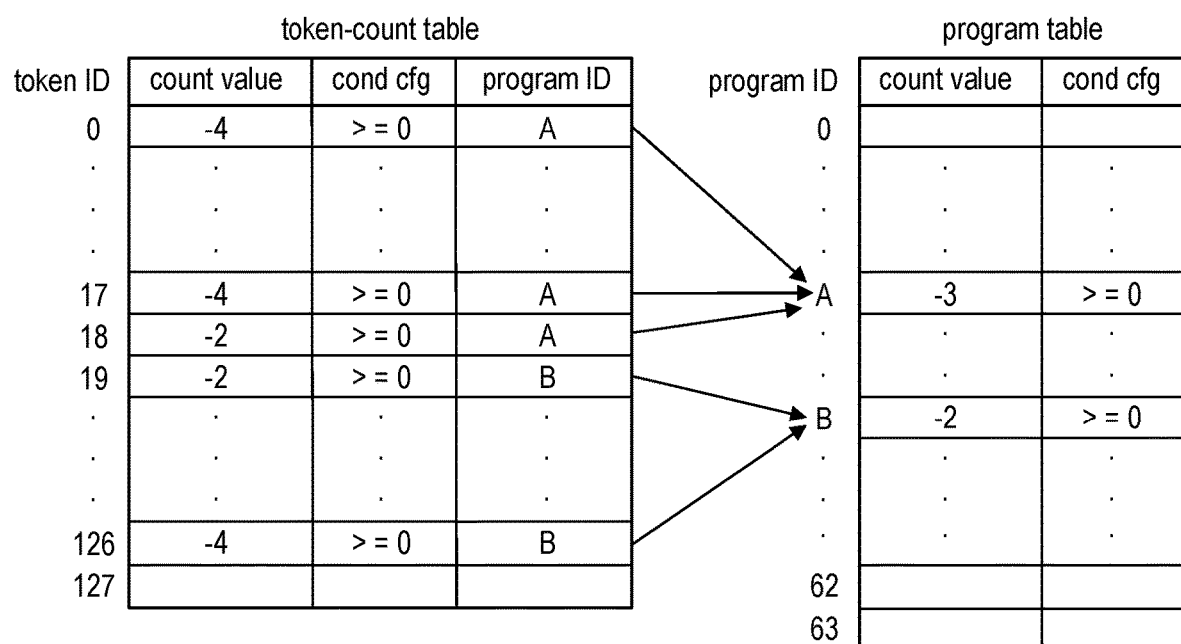
FIG. 6 illustrates a schematic of a first token-based control data structure interacting with a second token-based control data structure implemented with an integrated circuit in accordance with one or more embodiments of the present application.

Referring to the example program table (discussed above), when the count value for Program A in the example program table has satisfied its condition, S340 may function to update a notification interface to reflect that trigger-condition dependent status of Program A as having met its prerequisites, as shown by way of example in FIG. 6. That is, S340 may function to change an entry for the trigger-condition dependent status from not satisfied to satisfied or the like. Any suitable update indicating a satisfaction of the condition for executing Program A may be made by S340. Responsively, the system implementing the method 200 and/or the method 300 may function to automatically execute the Program A or the like at one or more of the intelligence processing tiles or other computing circuitry within the system.

5. Computer Program Product(s) Implementing Intelligence Processing and/or Token-Based Control of Intelligence Processing The systems and methods of the preferred embodiments and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various methods described herein.

As a person skilled in the art will recognize from the previous detailed description and from the figures and claims, modifications and changes can be made to the preferred embodiments of the invention without departing from the scope of this invention defined in the following claims.

What is claimed is:

1. An integrated circuit comprising:
a plurality of computing tiles, wherein arranged on each distinct computing tile of the plurality of computing tiles are:
(i) a matrix multiply accelerator;
(ii) a computing processing circuit;
(iii) a flow scoreboard module that includes:
(a) a first data structure that tracks a count of one or more distinct tokens presented via a token interface of the flow scoreboard module,
(b) a second data structure that indexes one or more distinct programs and executes the one or more distinct programs based on an internal state of the first data structure; and
(iv) a local data buffer;
wherein the plurality of computing tiles together define an intelligence processing array;
a network-on-chip system comprising:
a plurality of network-on-chip routers establishing a communication network among the plurality of computing tiles, wherein each network-on-chip router is in operable communication connection with at least one of the plurality of computing tiles and a distinct network-on-chip router of the plurality of network-on-chip routers; and
an off-tile buffer that is arranged in remote communication with the plurality of computing tiles, wherein the off-tile buffer stores raw input data or data received from an upstream process or an upstream device.

2. The integrated circuit according to claim 1, wherein the local data buffers is arranged adjacent the matrix multiply accelerator of each distinct computing tile of the plurality of computing tiles.

3. The integrated circuit according to claim 1, wherein the flow scoreboard module comprises:
a configuration interface that reads and/or writes an internal state of the flow scoreboard module;
a token interface presents token tokens to the flow scoreboard module that responsively triggers an update to the internal state of the flow scoreboard module;
a notification interface indicates to the integrated circuit whether one or more conditions for executing one or more programs or one or more applications have been satisfied.

4. The integrated circuit according to claim 1, further comprising:
a tile sector controller circuit includes a high voltage circuit that reprograms each of a plurality of non-volatile memories of at least a subset of the plurality of computing tiles into one or more distinct memory states.

5. The integrated circuit according to claim 1, further comprising:
a serial connection bus that is arranged between the off-tile buffer and the plurality of computing tiles, wherein the serial connection bus passes data from the off-tile buffer to one or more local data buffers of the plurality of computing tiles.

6. The integrated circuit according to claim 5, wherein the serial connection bus comprises one of a universal serial bus and a peripheral component interconnect express.

7. The integrated circuit according to claim 1, wherein each of the plurality of computing tiles further comprises:
a single instruction multiple data unit.

8. The integrated circuit according to claim 1, wherein the intelligence processing array includes a plurality of distinct data processing pipelines, wherein each of the plurality of distinct data processing pipelines is defined by a distinct subset of the plurality of computing tiles within the intelligence processing array.

9. The integrated circuit according to claim 8, wherein:
the intelligence processing array processes a plurality of distinct applications or programs, and each of the plurality of distinct data processing pipelines of the integrated circuit array processes one of the plurality of distinct applications or programs.

10. The integrated circuit according to claim 8, wherein the intelligence processing array processes a plurality of distinct partitions of a single application or a single program, and
each of the plurality of distinct data processing pipelines of the integrated circuit array processes one of the plurality of distinct partitions of the single application or the single program.

11. The integrated circuit according to claim 8, wherein each of the plurality of the intelligence processing pipeline includes a plurality of distinct stages, wherein each of the plurality of distinct stages includes at least one of the plurality of computing tiles that is specifically programmed to execute a fraction of an application or a program.

12. The integrated circuit according to claim 1, wherein each of the plurality of computing tiles access input data from its respective local data buffer;
processes the input data at its respective matrix multiply accelerator; and
returns an output of the input data back into the respective local data buffer.

13. The integrated circuit according to claim 1, wherein the flow scoreboard module includes a plurality of distinct interfaces that implement a flow control of data of data flowing through one or more intelligence processing pipelines and that control an execution of applications or programs being handled by the one or more intelligence processing pipelines of the intelligence processing array.

14. The integrated circuit according to claim 1, wherein the flow scoreboard comprises:
a token count table that tracks:
one or more token-based conditions;
a program control table that controls an execution of one or more programs based on the tracking of the one or more distinct tokens and the one or more token-based conditions.

15. An intelligence processing integrated circuit comprising:
a plurality of intelligence processing tiles, wherein arranged on each distinct processing tile of the plurality of intelligence processing tiles are:
(i) an accelerator circuit;
(ii) a processing circuit;
(iii) a token-based governance module that includes:
(a) a first data structure that tracks a count of one or more distinct tokens presented via a token interface of the flow scoreboard module;
(b) a second data structure that indexes one or more distinct programs and executes the one or more distinct programs based on an internal state of the first data structure; and
(iv) an on-tile memory,
wherein the plurality of intelligence processing tiles together define an intelligence processing array;
a network-on-chip system comprising:
a plurality of network-on-chip routers establishing a communication network among components of the intelligence processing integrated circuit, wherein each network-on-chip router is in operable communication connection with at least one of the plurality of computing tiles and a distinct network-on-chip router of the plurality of network-on-chip routers; and
an off-tile buffer that is arranged in remote communication with the plurality of computing tiles, wherein the off-tile buffer stores raw input data and/or data received from an upstream process or an upstream device.

16. The intelligence processing integrated circuit according to claim 15,
wherein the first token-based control data structure and the second-token based control data operate in cooperation to control an automated flow of the input data and/or an automated processing of the input data through the intelligence processing array.

* * * * *